(12) United States Patent  
Brown et al.

(10) Patent No.: US 8,839,297 B2
(45) Date of Patent: Sep. 16, 2014

(54) NAVIGATION OF MULTIMEDIA CONTENT (75) Inventors: William A. Brown, Woodstock, GA (US); Virginia Seid Ng, Lawrenceville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 778 days.

(21) Appl. No.: 12/413,253

(22) Filed: Mar. 27, 2009

(65) Prior Publication Data

US 2010/0251298 A1  Sep. 30, 2010

(51) Int. Cl.
*H04N 7/16* (2011.01)
*H04N 21/482* (2011.01)

(52) U.S. Cl.
CPC .................................. *H04N 21/482* (2013.01)
USPC .................................. 725/45; 725/44; 725/46

(58) Field of Classification Search
None
See application file for complete search history.

(56) References Cited

U.S. PATENT DOCUMENTS

| 5,559,944 | A | * | 9/1996 | Ono .............................. 715/841 |
| 6,047,197 | A | | 4/2000 | Jarrad |
| 6,453,281 | B1 | | 9/2002 | Walters |
| 7,418,670 | B2 | | 8/2008 | Goldsmith |
| 8,196,174 | B2 | * | 6/2012 | Piepenbrink et al. ......... 725/151 |
| 2001/0049677 | A1 | * | 12/2001 | Talib et al. ........................ 707/3 |
| 2002/0174430 | A1 | * | 11/2002 | Ellis et al. ....................... 725/46 |
| 2003/0106054 | A1 | * | 6/2003 | Billmaier et al. ............... 725/39 |
| 2003/0218637 | A1 | * | 11/2003 | Sloo et al. ...................... 345/810 |
| 2006/0103662 | A1 | | 5/2006 | Kim |
| 2006/0174266 | A1 | * | 8/2006 | Gatto et al. ...................... 725/37 |
| 2007/0200875 | A1 | | 8/2007 | Seeger |
| 2008/0092173 | A1 | * | 4/2008 | Shannon et al. ................. 725/47 |

* cited by examiner

*Primary Examiner* — Fernando Alcon
(74) *Attorney, Agent, or Firm* — Toler Law Group, PC (57) ABSTRACT Methods and systems for navigating multimedia content are disclosed. A first plurality of selectable icons is displayed. A selection of a particular selectable icon of the first plurality of selectable icons is received. The particular selectable icon represents multimedia content associated with a particular user. In response to receiving the selection of the particular selectable icon, a display of a second plurality of selectable icons is initiated. At least one of the second plurality of selectable icons represents a particular multimedia program that is associated with the particular user.

15 Claims, 10 Drawing Sheets

NAVIGATION OF MULTIMEDIA CONTENT

FIELD OF THE DISCLOSURE

The present disclosure is generally related to navigation of multimedia content available via a multimedia distribution system.

BACKGROUND

Content providers continue to increase the amount of multimedia content available via multimedia distribution systems. For example, a high-definition television (HDTV) system may offer a subscriber hundreds of different channels where the subscriber may view multimedia content. Additionally, a subscriber may store recorded multimedia content on electronic devices that are communicatively coupled to a multimedia distribution system such as a digital video recorder (DVR) or a server accessible to the subscriber via a network. The subscriber may store multimedia content made available via the multimedia distribution system, such as episodes of a recorded television program, for example. The subscriber may also store multimedia content created by the subscriber, such as a video captured using a personal video camera or photos taken with a personal camera, for example.

DETAILED DESCRIPTION

Systems and methods of navigating multimedia content are disclosed. In a first particular embodiment, a method of navigating multimedia content includes displaying a first plurality of selectable icons. Each selectable icon of the first plurality of selectable icons represents multimedia content associated with a user. The method also includes receiving a selection of a particular selectable icon of the first plurality of selectable icons, where the particular selectable icon represents multimedia content associated with a particular user. In response to receiving the selection of the particular selectable icon, the method initiates display of a second plurality of selectable icons, where at least one selectable icon of the second plurality of selectable icons represents a particular multimedia program that is associated with the particular user.

In a second particular embodiment, a set-top box for navigating multimedia content is disclosed. The set-top box includes a network interface component and a graphical viewing navigation module. The set-top box is configured to communicate with a multimedia distribution system such as an Internet Protocol television (IPTV) system. The graphical viewing navigation module is configured to initiate a display, at a display device, of a first plurality of selectable icons. Each selectable icon of the first plurality of selectable icons represents multimedia content associated with a particular user. The graphical viewing navigation module is also configured to receive a selection of a particular selectable icon of the first plurality of selectable icons. The particular selectable icon represents multimedia content associated with a particular user. The graphical viewing navigation module is further configured to respond to receiving the selection of the particular selectable icon. In response to receiving the selection of the particular selectable icon, the graphical viewing navigation module initiates display, at the display device, of a second plurality of selectable icons. The second plurality of selectable icons includes at least one selectable icon that represents a particular multimedia program that is associated with the particular user and further includes at least one selectable icon that represents a collection of stored multimedia content associated with the particular user. The at least one selectable icon that represents the particular multimedia program is selectable to initiate a search of the multimedia distribution system to locate episodes of the particular multimedia program that are available for display and that are in progress. The collection of stored multimedia content is stored at a storage device accessible to the set-top box device.

In a third particular embodiment, a computer-readable storage medium for navigating multimedia content is disclosed. The computer-readable storage medium includes computer-executable instructions that, when executed by a processor, enable the processor to initiate a display of a first plurality of selectable icons. Each selectable icon of the first plurality of selectable icons represents multimedia content associated with a user. The computer-executable instructions also enable the processor to receive a selection of a particular icon of the first plurality of selectable icons. The particular icon represents multimedia content associated with a particular user. The computer-executable instructions also enable the processor, in response to receiving the selection of the particular icon, to initiate a display of a second plurality of selectable icons. The second plurality of selectable icons includes at least one selectable icon that represents a particular multimedia program associated with the particular user and further includes at least one selectable icon that represents a collection of stored multimedia content associated with the particular user. The at least one selectable icon that represents the particular multimedia program is selectable to cause a multimedia receiver to initiate a search of a multimedia distribution system to locate episodes of the particular programs that are available to the multimedia receiver and that are in progress.

Figure 1:
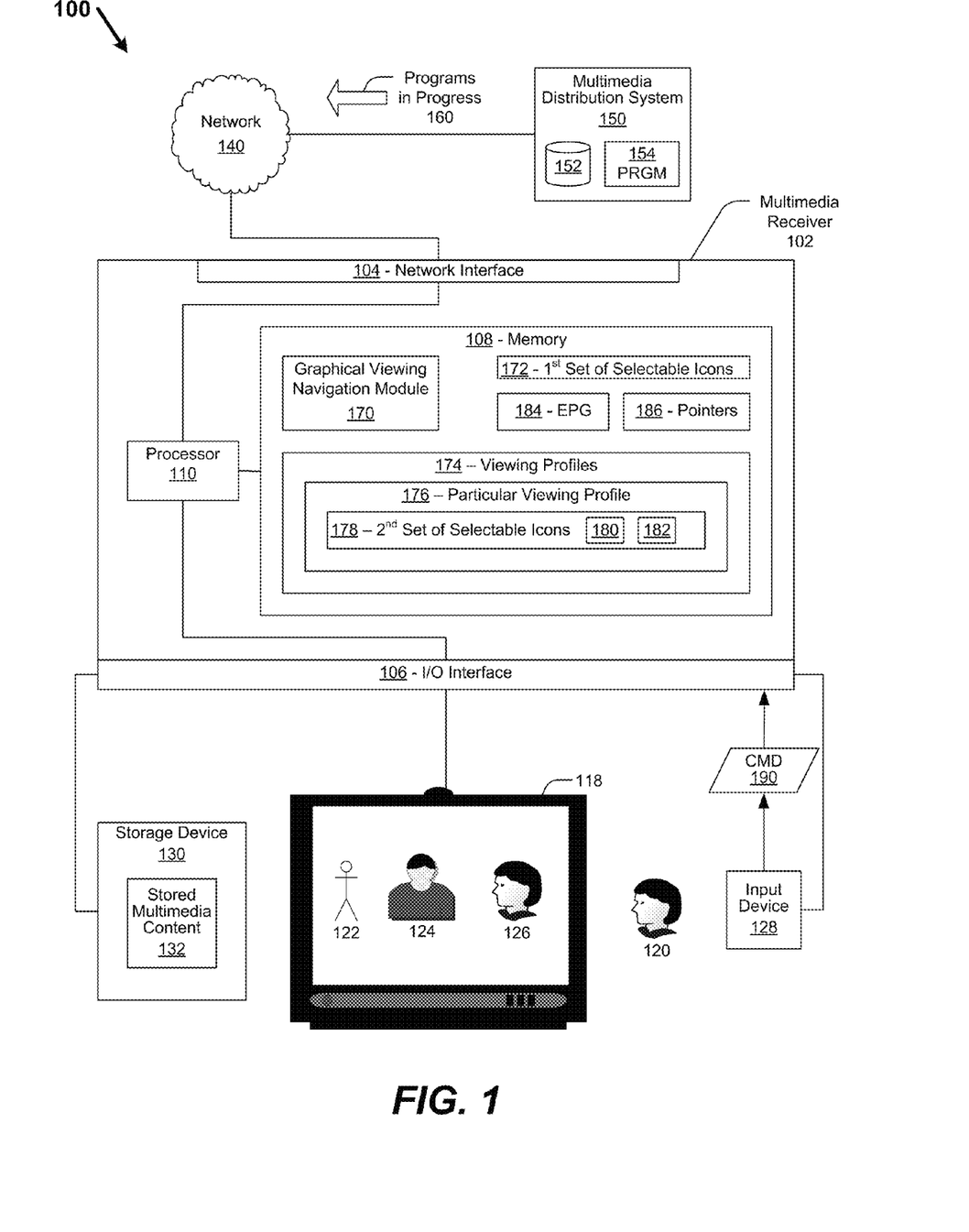
FIG. 1 is an illustration of a first particular embodiment of a system to navigate multimedia content.

Referring to FIG. 1, an illustrative embodiment of a system 100 to navigate multimedia content is disclosed. The system 100 includes a multimedia receiver 102 connected to a network 140. The network 140 provides the multimedia receiver 102 with access to a multimedia distribution system 150. The multimedia receiver 102 may include a set-top box or a personal computer, for example. The multimedia receiver 102 is also connected to a display device 118, an input device 128, and a storage device 130. The input device 128 may include a computer mouse or a controller such as a remote control used in conjunction with a television system, for example. The storage device 130 may include a digital video recorder (DVR), for example. The multimedia distribution system 130 may include an Internet Protocol television (IPTV) system or a Cable television (CATV) system, for example. The network 140 may include an IPTV access network or a CATV network 140, for example.

The multimedia receiver 102 includes a processor 110. The multimedia receiver 102 also includes a network interface 104 accessible to the processor 110, an input/output (I/O) interface 106 accessible to the processor 110, and a memory 108 accessible to the processor. The network interface 104 enables the multimedia receiver 102 to connect to the network 140, providing the multimedia receiver 102 with access to the multimedia distribution system 150. The I/O interface 106 enables the multimedia receiver 102 to connect to the display device 118, to the input device 128, and to the storage device 130.

The memory 108 includes a graphical viewing navigation module 170, a first plurality of selectable icons 172, viewing profiles 174, an electronic program guide (EPG) 184, and pointers 186 to multimedia content 132 stored at the storage device 130. The first plurality of selectable icons 172 correspond to the user viewing profiles 174. Each viewing profile of the user view profiles 174 corresponds to viewing preferences of a user. When displayed on the display device 118, each selectable icon of the first plurality of selectable icons 172 represents multimedia content associated with a user. The viewing profiles 174 include at least one particular viewing profile 176. In particular embodiments, the particular viewing profile includes information describing a particular user's viewing preferences. The information may include, for example, a list of the particular user's favorite television programs and a list of the particular user's favorite recorded multimedia content. The particular viewing profile 176 includes a second plurality of selectable icons 178 based on the particular viewing profile 176. When displayed on the display device 118, each selectable icon of the second plurality of selectable icons 178 represents multimedia content associated with the particular user. The second plurality of selectable icons 178 includes a first selectable icon 180 that represents a particular multimedia program that is associated with the particular user. For example, the first selectable icon may represent one of the particular user's favorite television programs. The second plurality of selectable icons 178 also includes a second selectable icon 182 that represents a collection of stored multimedia content associated with the particular user. In particular embodiments, the second selectable icon 182 is associated with a particular pointer of the pointers 186 that point to multimedia content 132 stored at the storage device 130. In particular embodiments, the particular pointer includes information enabling the multimedia receiver 102 to locate the multimedia content 132. For example, the particular pointer may include a directory name and a file name.

During operation, the processor 110 may execute computer-readable instructions included in the graphical viewing navigation module 170 to enable the multimedia receiver 102 to perform methods disclosed herein. In particular embodiments, the graphical viewing navigation module 170 is configured to initiate a display, at the display device 118, of a first plurality of selectable icons 172 where each selectable icon of the first plurality of selectable icons 172 represents multimedia content associated with a user. The graphical viewing navigation module 170 may be configured to receive a selection of a particular selectable icon of the first plurality of selectable icons 172, where the particular selectable icon represents multimedia content associated with a particular user.

Additionally, the graphical viewing navigation module 170 may be configured to respond to receiving the selection of the particular selectable icon and, in response to receiving the selection of the particular selectable icon, initiate a display, at the display device 118, of a second plurality of selectable icons 178. The second plurality of selectable icons 178 includes at least one selectable icon 180 that represents a particular multimedia program that is associated with the particular user. The at least one selectable icon 180 that represents the particular multimedia program is selectable to initiate a search of the multimedia distribution system 150 to locate episodes of the particular multimedia program that are available for display and that are in progress. The second plurality of selectable icons 178 also includes at least one selectable icon 182 that represents a collection of stored multimedia content 132 associated with the particular user. The collection of stored multimedia content 132 is stored at a storage device accessible to the storage device 102.

For example, a user 120 may use the input device 128 to interact with the display device 118 and the multimedia receiver 102. As the user 120 interacts with the display device 118 and the multimedia receiver 102, the input device 128 may send one or more commands (CMD) 190 to the multimedia receiver 102 via the I/O interface 106. In a particular embodiment, the multimedia receiver 102 initiates display, at the display device 118, of the first plurality of selectable icons 172. The display device 118 illustrates an example of displaying a first plurality of selectable icons 172 including three selectable icons 122, 124, 126. One or more of the first plurality of selectable icons 172 may represent multimedia content associated with the user 120. In a particular embodiment, the selectable icon 126 represents multimedia content associated with the user 120. The user 120 may use the input device 128 to select a particular selectable icon of the first plurality of selectable icons 172. In response to receiving the selection of the particular selectable icon, the multimedia receiver 102 initiates a display of a second plurality of selectable icons. For example, the user 120 may use the input device 128 to select the particular selectable icon 126 representing multimedia content associated with the user 120. In response to receiving the selection of the particular icon 126, the multimedia receiver 102 may initiate a display of the second plurality of selectable icons 178. In particular embodiments, at least one selectable icon of the second plurality of selectable icons 178 represents a particular multimedia program 154 that is associated with the user 120. For example, the particular multimedia program 154 may be a favorite television program of the user 120.

In particular embodiments, the multimedia receiver 102 prompts the user 120 for a user access credential after the user 120 has selected a selectable icon of the first plurality of selectable icons 172. In this manner, users can protect their viewing profile(s) from being accessed by unauthorized viewers. If the user 120 enters an appropriate user access credential in response to the prompt, the multimedia receiver 102 may initiate a display of a second plurality of selectable icons. In particular embodiments, a user that enters an appropriate user access credential may be given permission to modify the particular viewing profile corresponding to the particular selectable icon. In this manner, the user may modify (e.g., add to or remove) multimedia content from the viewing profile corresponding to the selected icon of the first plurality of selectable icons 172.

In particular embodiments, at least one selectable icon of the first plurality of selectable icons 172 is modifiable by a user associated with a corresponding profile of the at least one selectable icon. In a particular embodiment, the selectable icon 126 corresponds to the viewing profile of the user 120. The user 120 may wish to have the image of the selectable icon 126 representing multimedia content associated with her to be an image of herself. Alternately, the user 120 may wish the image of the selectable icon 126 representing multimedia content associated with the user 120 to be some other image, such as an image of the user's 120 favorite cartoon character or the user's favorite talk show host, for example. In particular embodiments, the user 120 may modify the selectable icon 126 representing multimedia content associated with the user 120 by retrieving an image from a storage device, such as the storage device 130, for example. In particular embodiments, the user 120 may modify the selectable icon 126 representing multimedia content associated with the user 120 via the network 140 by retrieving an image from the data server 152 at the multimedia distribution system 150.

In particular embodiments, at least one selectable icon of the second plurality of selectable icons 178 represents a particular multimedia program 154 that is associated with the particular viewing profile 176. For example, the at least one selectable icon of the second plurality of selectable icons 178 may represent one of the user's 120 favorite television shows. The image of the at least one selectable icon may, for example, include a logo for the television show or an image of a star character in the television show.

The user 120 may use the input device 128 to select a particular selectable icon the particular multimedia program 154. In response to receiving the selection of the particular selectable icon, the multimedia receiver 102 may initiate a search of the multimedia distribution system 150 to locate episodes of the particular multimedia program 154 that are available to the multimedia receiver 102 and that are in progress. In particular embodiments, a program in progress includes programs that the multimedia distribution system 150 is currently providing to the network 140, but the multimedia receiver 102 may not be currently receiving. In particular embodiments, the multimedia receiver 102, such as a set-top box, may receive a program in progress by tuning the multimedia receiver 102 to a channel on which the program in progress in being provided by the multimedia distribution system 150. Thus, the located episodes of the particular multimedia program 154 may be included in programs in progress 160. Each episode may be a different showing of the particular multimedia program, such as a rerun, or may be the same showing that is provided on a different channel. In particular embodiments, the search of the multimedia distribution system 150 may include a search of an electronic program guide, such as the electronic program guide 184 in the memory 108 of the multimedia receiver 102.

In particular embodiments, at least one selectable icon of the second plurality of selectable icons 178 represents a collection of stored multimedia content 132 corresponding to the particular viewing profile 176 and associated with the selected particular icon 126. Each of the at least one selectable icon of the second plurality of selectable icons 178 may be associated with one or more pointers 186 that provide the location(s) of the stored multimedia content 132 at the storage device 130. Alternately, the stored multimedia content may be located at the data server 152 of the multimedia distribution system 150 and the one or more pointers 186 may provide the location(s) of the stored multimedia content at the data server 152 of the multimedia distribution system 150.

The user 120 may use the input device 128 to select a particular selectable icon of the second plurality of selectable icons 178 representing a collection of stored multimedia content 132 associated with the user 120. In response to receiving the selection of the particular selectable icon, the multimedia receiver 102 may initiate a display of a third plurality of selectable icons, where each selectable icon of the third plurality of selectable icons is selectable to initiate playback of particular stored multimedia content 132 associated with the user 120. In particular embodiments, at least one selectable icon of the second plurality of selectable icons 178 is selectable to initiate playback of stored multimedia content 132 at the storage device 130 associated with the user 120.

The system 100 provides a user a method for more easily navigating large amounts of multimedia content that a user has placed in a viewing profile. The multimedia content may be graphically represented on a display device. For example, a favorite television show of a younger viewer may be represented by a selectable icon having an image that looks like the younger viewer's favorite character in the television show. The user may use the system 100 to navigate both programs in progress and stored multimedia including programs that have been previously recorded.

Figure 2:
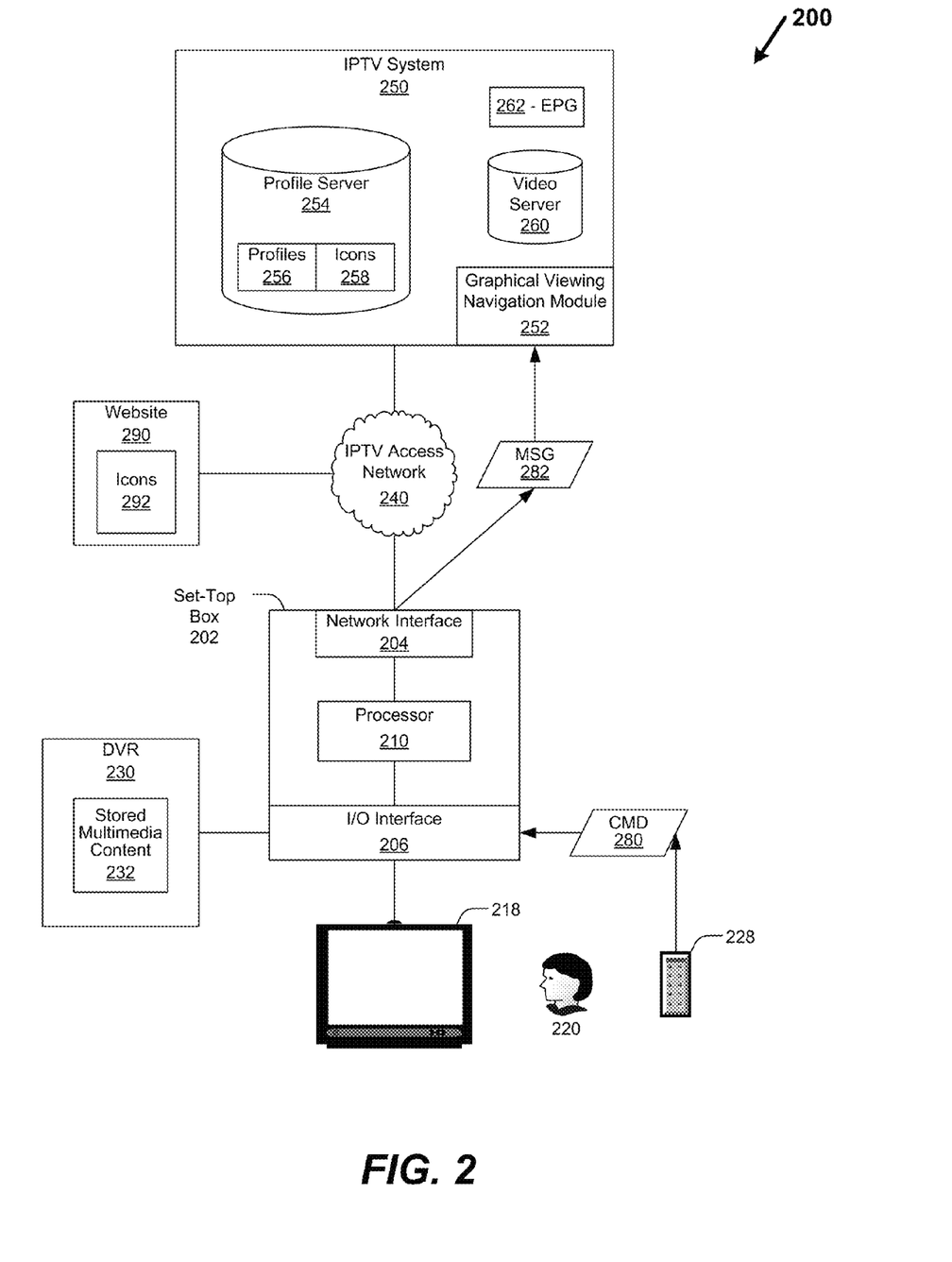
FIG. 2 is an illustration of a second particular embodiment of a system to navigate multimedia content.

Referring to FIG. 2, a second illustrative embodiment of a system 200 to navigate multimedia content is disclosed. The system 200 includes a set-top box 202 connected to an IPTV access network 240. The IPTV access network 240 provides the set-top box 202 with access to an IPTV system 250.

The set-top box 202 includes a processor 210, a network interface 204, and an I/O interface 206. The network interface 204 and the I/O interface 206 are accessible to the processor 210. The network interface 204 enables the set-top box 202 to connect to the IPTV access network 240, providing the set-top box 202 with access to the IPTV system 250 and to a website 290. The I/O interface 206 enables the set-top box 202 to connect to the display device 218 and to the digital video recorder (DVR) 230. The display device 218 may include or may be similar to the display device 118 depicted in FIG. 1. The DVR 230 can be used to store multimedia content 232. The I/O interface 206 also enables the set-top box 202 to communicate with the controller 228. The IPTV system 250 includes a graphical viewing navigation module 252, a profile server 254, a video server 260, and an electronic program guide (EPG) 262. The profile server includes viewing profiles 256 and icons 258. The website 290 includes icons 292.

During operation, a user 220 may use the controller 228 to interact with the display device 218 and with the set-top box 202. In particular embodiments, the user 220 may interact with the display device 218 and the set-top box 202 in the same or a similar manner that the user 120 interacts with the display device 118 and the multimedia receiver 102 depicted in FIG. 1.

As the user 220 interacts with the display device 218 and the set-top box 202, the controller 228 may send one or more commands, such as CMD 280, to the set-top box 202 via the I/O interface 206. Upon receiving the commands 280, the set-top box 202 may send one or more messages, such as MSG 282, to the graphical viewing navigation module 252 at the IPTV system 250 via the IPTV access network 240. The IPTV system 250 may execute computer-readable instructions included in the graphical viewing navigation module 252 to enable the system 200 to perform methods disclosed herein. In particular embodiments, the graphical viewing navigation module 252 is configured to initiate a display, at the display device 218, of a first plurality of selectable icons. Each selectable icon of the first plurality of selectable icons represents multimedia content associated with a user. The first plurality of selectable icons may include one or more icons from the icons 258 stored at the profile server 254. The first plurality of selectable icons may also include one or more icons from the icons 292 stored at the website 290. The graphical viewing navigation module 252 may be configured to receive a selection of a particular selectable icon of the first plurality of selectable icons. The particular selectable icon may correspond to a particular viewing profile. The particular viewing profile may be one of the viewing profiles 256 stored at the profile server 254. In particular embodiments the particular selectable icon represents multimedia content associated with a user.

Additionally, the graphical viewing navigation module 252 may be configured to respond to receiving the selection of the particular selectable icon and, in response to receiving the selection of the particular selectable icon, initiate a display, at the display device 218, of a second plurality of selectable icons corresponding to the particular viewing profile. The second plurality of selectable icons includes at least one selectable icon that represents a particular multimedia program that is associated with a particular user. The at least one selectable icon that represents the particular multimedia program is selectable to initiate a search of the IPTV system 250 to locate episodes of the particular multimedia program that are available for display and that are in progress, such as multimedia programs provided by the video server 260. The second plurality of selectable icons further includes at least one selectable icon that represents a collection of stored multimedia content associated with the particular user. The collection of stored multimedia content may be stored at a storage device accessible to the set-top box 202, such as the multimedia content 232 stored at the DVR 230, for example.

The system 200 provides a user a method for more easily navigating large amounts of multimedia content. The multimedia content may include multimedia programs in progress provided by the IPTV system 250. The multimedia content may also include store multimedia content that has been previously recorded.

Figure 3:
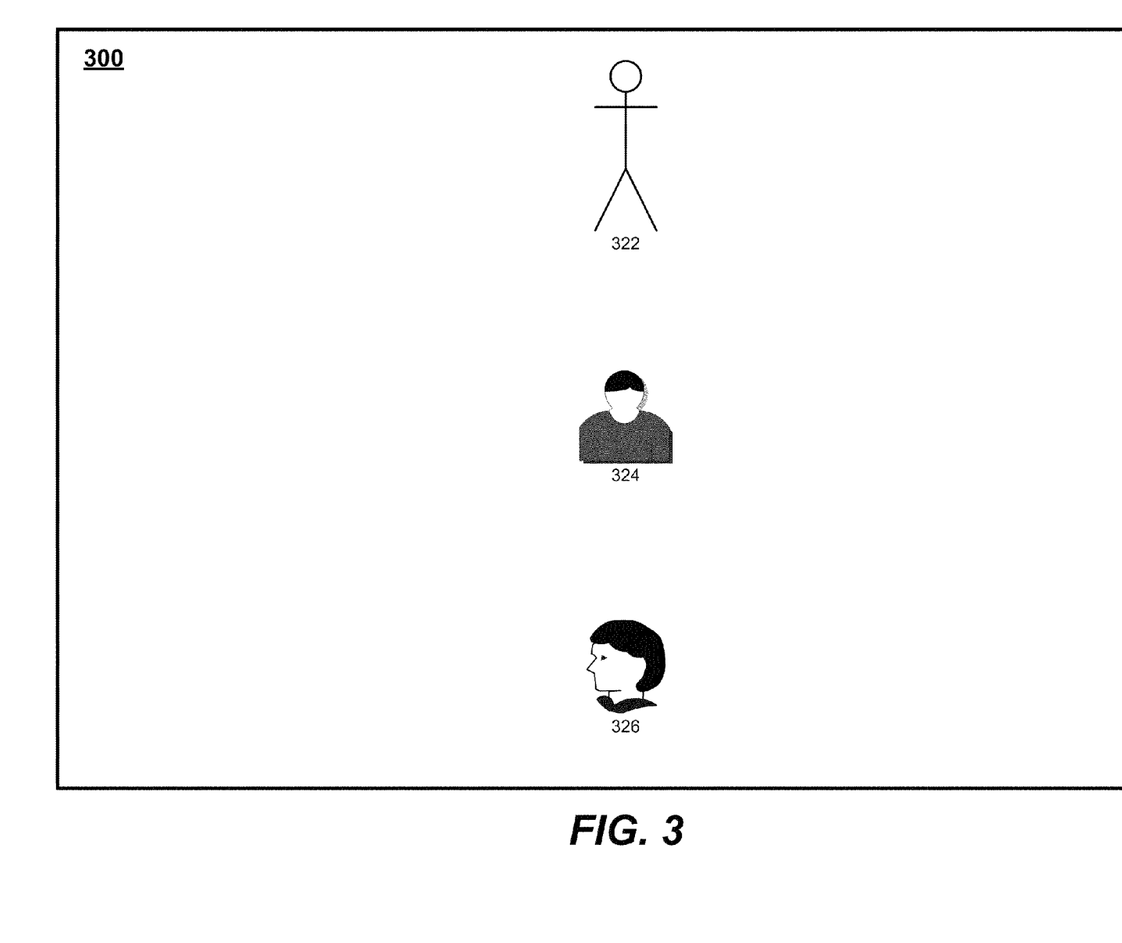
FIG. 3 is an illustration of a display screen showing three selectable icons with each selectable icon corresponding to a user viewing profile.

Referring to FIG. 3, a display screen 300 shows three illustrative selectable icons 322, 324, 326, and each of the selectable icons represents multimedia content associated with a user. The display screen may be a display screen of the display device 118 depicted in FIG. 1 or the display screen of the display device 218 depicted in FIG. 2, for example. The three selectable icons 322, 324, 326 may comprise the first plurality of selectable icons 172 described in relation to FIG. 1 or the first plurality of selectable icons described in relation to FIG. 2. Thus, a user may select a particular selectable icon of the three selectable icons 322, 324, 326 to select further viewing options corresponding to the user's viewing profile.

Figure 4:
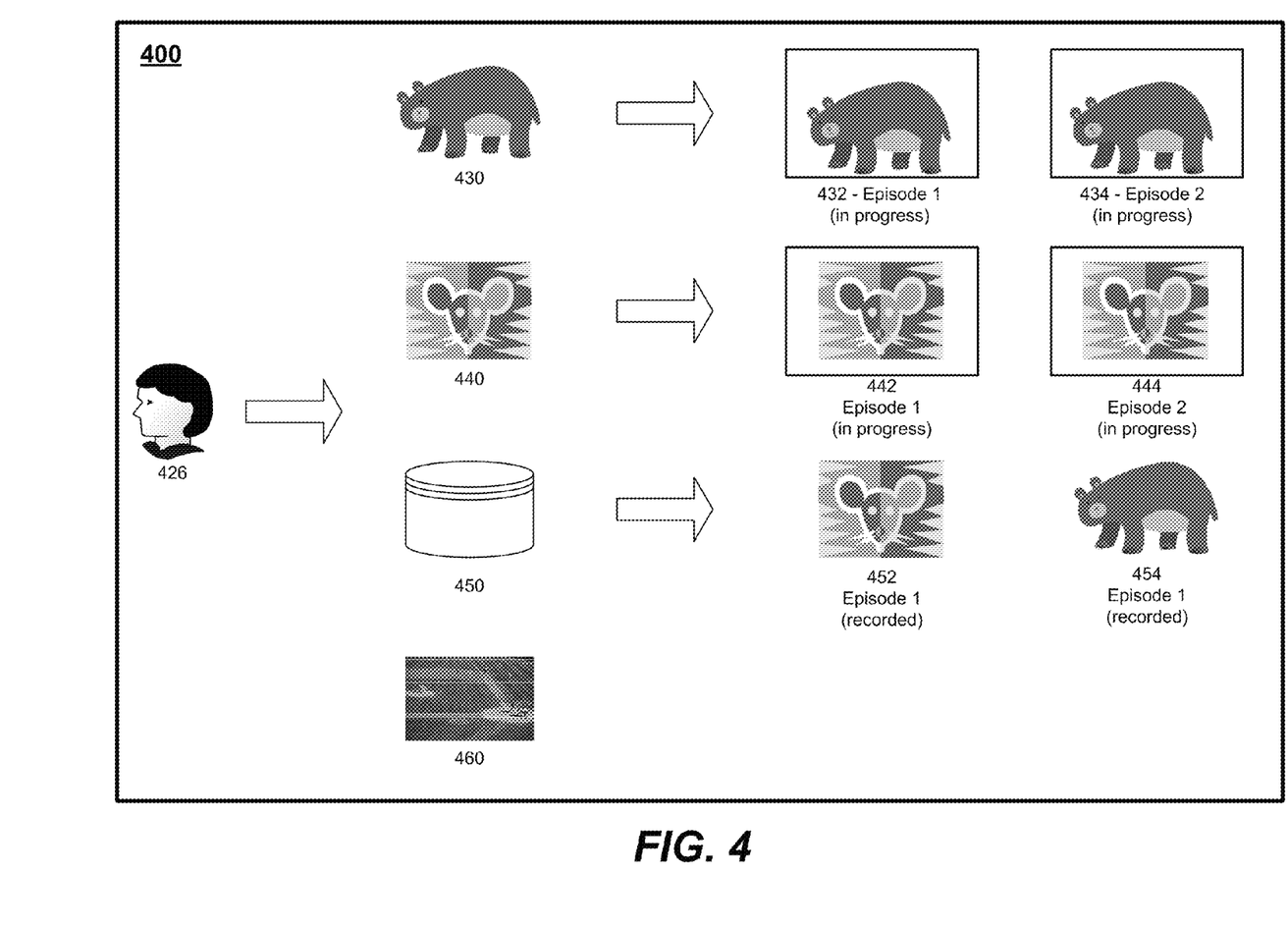
FIG. 4 is an illustration of a display screen as a display appears after a user has selected a particular selectable icon shown in FIG. 3 in accordance with particular embodiments of a system to navigate multimedia content.

Referring to FIG. 4, a display screen 400 is disclosed as a display appears after a user has selected a particular selectable icon 326 shown in FIG. 3 in accordance with particular embodiments of a system to navigate multimedia content. Displayed on the display screen 400 is an image 426 of the particular selectable icon 326 selected. Also displayed on the display screen 400 are four icons 430, 440, 450, 460 associated with the viewing profile corresponding to the particular selectable icon 326 selected. A first icon 430 represents a first particular multimedia program and the image of the first icon 430 may indicate to the user the particular multimedia program that the first icon 430 represents. The first icon 430 is associated with two selectable icons 432, 434. Each selectable icon 432, 434 may, for example, include a picture-in-a-picture (PIP) window displaying an episode of the first particular multimedia program that is in progress. The two selectable icons 432, 434 may represent different episodes of the first particular multimedia program or may represent the same episode of the first particular multimedia program provided on two different channels. In particular embodiments, the user may select one of the selectable icons 432, 434 to cause a multimedia receiver, such as a set-top box, to tune to a channel on which the corresponding episode is in progress and may present the episode to the display screen 400. A second icon 440 represents a second particular multimedia program and the image of the second icon 440 may indicate to the user the particular multimedia program that the second icon 440 represents. The second icon 440 is associated with two selectable icons 442, 444. Each selectable icon 442, 444 may, for example, include a picture-in-a-picture (PIP) window displaying an episode of the second particular multimedia program that is in progress. The user may select one of the selectable icons 442, 444 to cause a multimedia receiver, such as a set-top box, to tune to a channel on which the corresponding episode of the second particular multimedia program is in progress and present the episode to the display screen 400. A third icon 450 represents a collection of stored multimedia content. The stored multimedia content may include the stored multimedia content 132 depicted in FIG. 1 or the stored multimedia content 232 depicted in FIG. 2. The image of the third icon 450 may indicate to the user that the third icon 450 represents a collection of stored multimedia content. The third icon 450 is associated with two selectable icons 452, 454 with each icon representing distinct stored multimedia content. For example, a user may have previously recorded a particular episode of a particular multimedia program or may have previously recorded a particular sporting event. The user may wish to view the previously recorded multimedia content. By selecting one of the two selectable icons 452, 454, the user may cause a multimedia receiver, such as a set-top box, to initiate playback of the particular stored multimedia content represented by the selected icon. A fourth icon 460 is a selectable icon that represents particular stored multimedia content. By selecting the fourth icon 460, the user may cause a multimedia receiver, such as a set-top box, to initiate playback of the particular stored multimedia content represented by the fourth icon 460.

Figure 5:
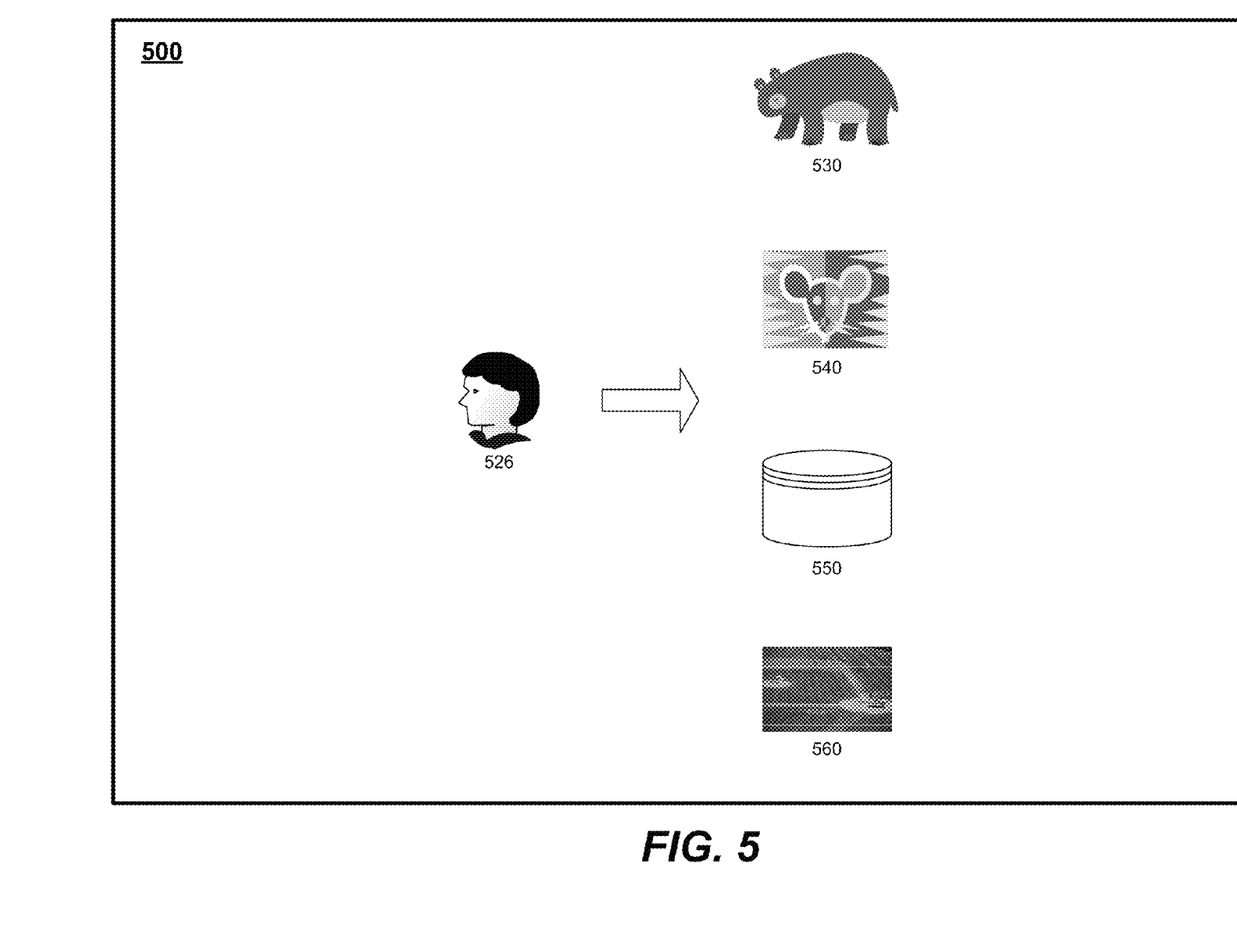
FIG. 5 is an illustration of a display screen showing four selectable icons corresponding to a particular user viewing profile displayed after a user has selected a particular selectable icon shown in FIG. 3 in accordance with particular embodiments of a system to navigate multimedia content.

Referring to FIG. 5, a display screen 500 is disclosed as the display appears after a user has selected a particular selectable icon 326 shown in FIG. 3 in accordance with particular embodiments of a system to navigate multimedia content. Displayed on the display screen 500 is an image 526 of the particular selectable icon 326 selected. Also displayed on the display screen 500 are four representative selectable icons 530, 540, 550, 560 associated with the viewing profile corresponding to the particular selectable icon 326. In a first particular embodiment, the four selectable icons 530, 540, 550, 560 comprise the second plurality of selectable icons described in relation to FIG. 1. In a second particular embodiment, the four selectable icons 530, 540, 550, 560 comprise the second plurality of selectable icons described in relation to FIG. 2.

A first selectable icon 530 represents a first particular multimedia program and the image of the first icon 530 may indicate to the user the particular multimedia program that the first selectable icon 530 represents. The user may select the first selectable icon 530 to determine if any episodes of the first particular program are currently available and in progress. A second selectable icon 540 represents a second particular multimedia program, and the image of the second icon 540 may indicate to the user the particular multimedia program that the second selectable icon 540 represents. The user may select the second selectable icon 540 to determine if any episodes of the second particular program are currently available and in progress. A third selectable icon 550 represents a collection of stored multimedia content. The stored multimedia content may include the stored multimedia content 132 depicted in FIG. 1 or the stored multimedia content 232 depicted in FIG. 2. The image of the third selectable icon 550 may indicate to the user that the third selectable icon 550 represents a collection of stored multimedia content. The user may select the third selectable icon 550 to determine the contents of the collection of stored multimedia content. A fourth selectable icon 560 represents particular stored multimedia content. By selecting the fourth selectable icon 560, the user may cause a multimedia receiver, such as a set-top box, to initiate playback of the particular stored multimedia content represented by the fourth selectable icon 560.

Figure 6:
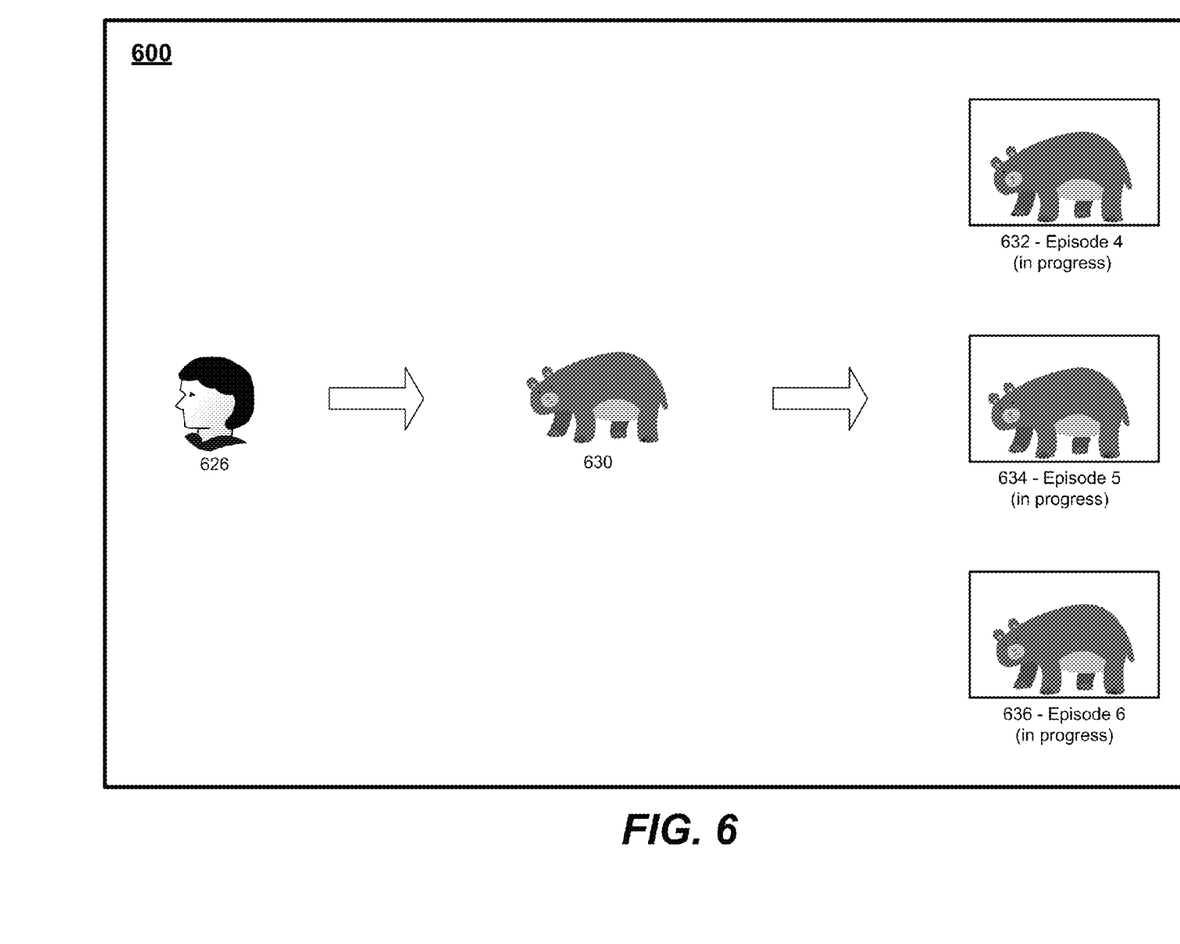
FIG. 6 is an illustration of a display screen as the display appears after a user has selected a first particular selectable icon shown in FIG. 5 in accordance with particular embodiments of a system to navigate multimedia content.

Referring to FIG. 6, a display screen 600 is disclosed as the display appears after a user has selected a particular selectable icon 530 shown in FIG. 5 in accordance with particular embodiments of a system to navigate multimedia content. Displayed on the display screen 600 is an image 630 of the particular selectable icon 530 selected. Also displayed on the display screen 600 are three selectable icons 632, 634, 636. In a particular embodiment, the three selectable icons 632, 634, 636 comprise the third plurality of selectable icons described in relation to FIG. 1. Each selectable icon 632, 634, 636 may, for example, include a picture-in-a-picture (PIP) window displaying an in-progress episode of the particular multimedia program represented by the selectable icon 530 selected. The three selectable icons 632, 634, 636 may represent different episodes of the particular multimedia program or may represent the same episode of the particular multimedia program being provided on different channels. In particular embodiments, the user may select one of the selectable icons 632, 634, 636 to cause a multimedia receiver, such as a set-top box, to tune to a channel on which the corresponding episode is in progress to present the episode to the display screen 600.

Figure 7:
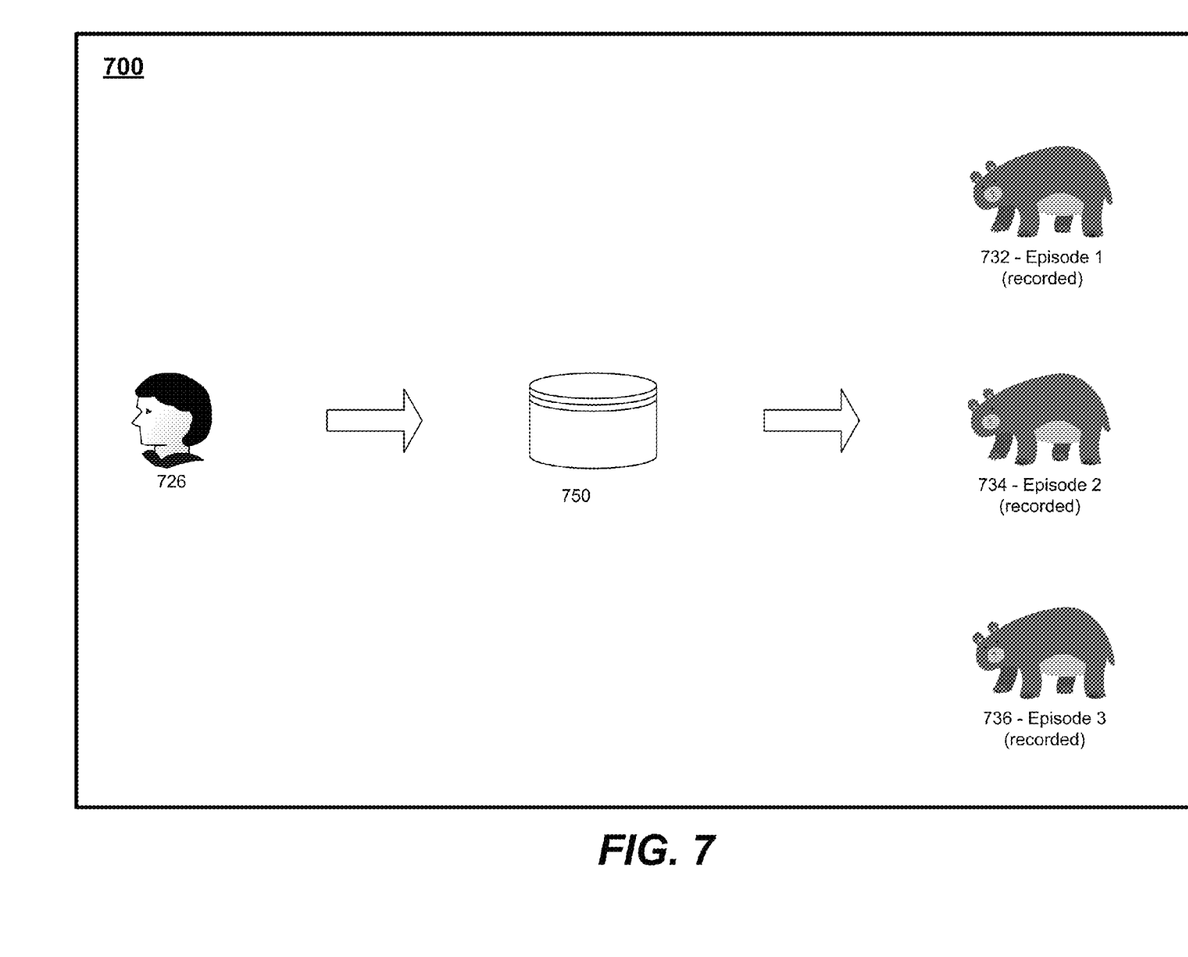
FIG. 7 is an illustration of a display screen as the display appears after a user has selected a second particular selectable icon shown in FIG. 5 in accordance with particular embodiments of a system to navigate multimedia content.

Referring to FIG. 7, a display screen 700 is disclosed as the display appears after a user has selected a particular selectable icon 550 shown in FIG. 5 in accordance with particular embodiments of a system to navigate multimedia content. Displayed on the display screen 700 is an image 750 of the particular selectable icon 550 selected. Also displayed on the display screen 700 are three selectable icons 732, 734, 736. Each of the three selectable icons 732, 734, 736 represents particular stored multimedia content. By selecting one of the three selectable icons 732, 734, 736 the user may cause a multimedia receiver, such as a set-top box, to initiate playback of the particular stored multimedia content represented by the selected icon.

Figure 8:
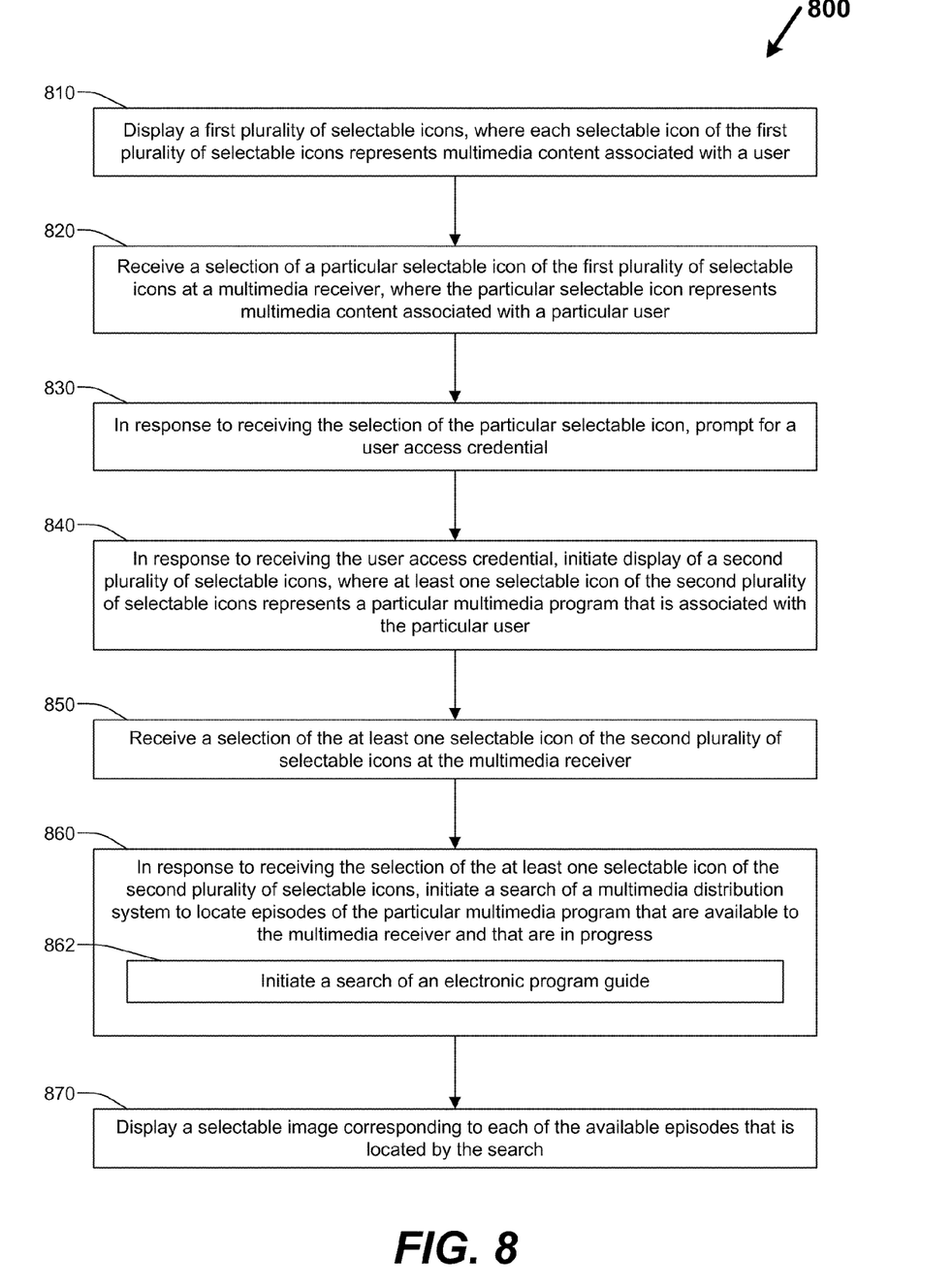
FIG. 8 is a flow chart of a first particular embodiment of a method of navigating multimedia content.

Referring to FIG. 8, a flow chart 800 of a first particular embodiment of a method of navigating multimedia content is disclosed. The method includes displaying a first plurality of selectable icons, where each selectable icon of the first plurality of selectable icons represents multimedia content associated with a user, at 810. For example, the first plurality of selectable icons may include the first plurality of selectable icons 172 described in relation to FIG. 1, the first plurality of selectable icons described in relation to FIG. 2, or the selectable icons 322, 324, 326 described in relation to FIG. 3.

Advancing to 820, the method includes receiving a selection of a particular selectable icon of the first plurality of selectable icons at a multimedia receiver, where the particular selectable icon represents multimedia content associated with a particular user. In a first particular embodiment, a user may interact with the display device 118 and the multimedia receiver 102 using the input device 128 as described in relation to FIG. 1 to make a selection. In a second particular embodiment, a user may interact with the display device 218 and the set-top box 202 using the controller 228 as described in relation to FIG. 2 to make a selection.

In response to receiving the selection of the particular selectable icon, the method prompts for a user access credential, at 830. In particular embodiments, a system for navigating multimedia content according to viewing profiles may prevent access to some viewing profiles by requiring a user access credential to be entered before the viewing profile can be accessed. A user access credential may include a personal identification number (PIN) or a username and a password, for example.

Advancing to 840, in response to receiving the user access credential, the method initiates display of a second plurality of selectable icons, where at least one selectable icon of the second plurality of selectable icons represents a particular multimedia program that is associated with the particular user. For example, the second plurality of selectable icons may include the second plurality of selectable icons 178 described in relation to FIG. 1, the second plurality of selectable icons described in relation to FIG. 2, or the selectable icons 530, 540, 550, 560 described in relation to FIG. 5.

Advancing to 850, the method includes receiving a selection of the at least one selectable icon of the second plurality of selectable icons at the multimedia receiver described in relation to the receiving at 820. In a first particular embodiment, a user may interact with the display device 118 and the multimedia receiver 102 using the input device 128 as described in relation to FIG. 1 to make a selection. In a second particular embodiment, a user may interact with the display device 218 and the set-top box 202 using the controller 228 as described in relation to FIG. 2 to make a selection.

Advancing to 860, in response to receiving the selection of the at least one selectable icon of the second plurality of selectable icons, the method initiates a search of a multimedia distribution system to locate episodes of the particular multimedia program that are available to the multimedia receiver and that are in progress. In particular embodiments, the method initiates a search of an electronic program guide, at 862. The method displays a selectable image corresponding to each available episode that is located by the search, at 870.

Figure 9:
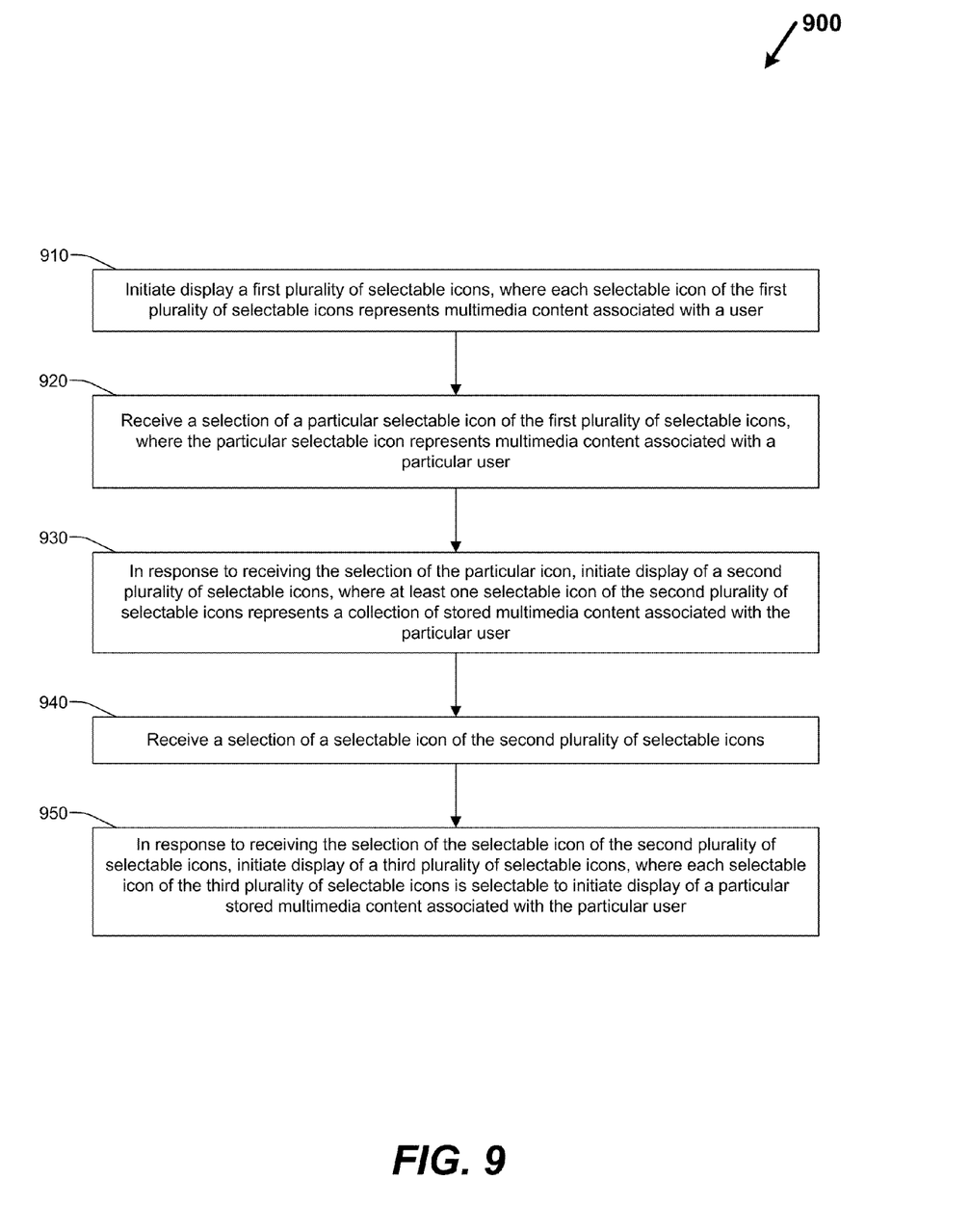
FIG. 9 is a flow chart of a second particular embodiment of a method of navigating multimedia content.

Referring to FIG. 9, a flow chart 900 of a second particular embodiment of a method of navigating multimedia content is disclosed. The method includes initiating display of a first plurality of selectable icons, where each selectable icon of the first plurality of selectable icons represents multimedia content associated with a user, at 910. For example, the first plurality of selectable icons may include the first plurality of selectable icons 172 described in relation to FIG. 1, the first plurality of selectable icons described in relation to FIG. 2, or the selectable icons 322, 324, 326 described in relation to FIG. 3.

Advancing to 920, the method includes receiving a selection of a particular selectable icon of the first plurality of selectable icons, where the particular selectable icon represents multimedia content associated with a particular user. In a first particular embodiment, a user may interact with the display device 118 and the multimedia receiver 102 using the input device 128 as described in relation to FIG. 1 to make a selection. In a second particular embodiment, a user may interact with the display device 218 and the set-top box 202 using the controller 228 as described in relation to FIG. 2 to make a selection.

Advancing to 930, in response to receiving the selection of the particular icon, the method includes initiating display of a second plurality of selectable icons, where at least one selectable icon of the second plurality of selectable icons represents a collection of stored multimedia content associated with the particular user. For example, the second plurality of selectable icons may include the second plurality of selectable icons 178 described in relation to FIG. 1, the second plurality of selectable icons described in relation to FIG. 2, or the selectable icons 530, 540, 550, 560 described in relation to FIG. 5.

Advancing to 940, the method includes receiving a selection of the at least one selectable icon of the second plurality of selectable icons. In a first particular embodiment, a user may interact with the display device 118 and the multimedia receiver 102 using the input device 128 as described in relation to FIG. 1 to make a selection. In a second particular embodiment, a user may interact with the display device 218 and the set-top box 202 using the controller 228 as described in relation to FIG. 2 to make a selection.

Advancing to 950, in response to receiving the selection of the selectable icon of the second plurality of selectable icons, the method initiates display of a third plurality of selectable icons, where each selectable icon of the third plurality of selectable icons is selectable to initiate a display of a particular stored multimedia content associated with the particular user. In a first particular embodiment, the third plurality of selectable icons includes the third plurality of selectable icons described in relation to FIG. 1. In a second particular embodiment, the third plurality of selectable icons includes the selectable icons 732, 734, 736 described in relation to FIG. 7.

Figure 10:
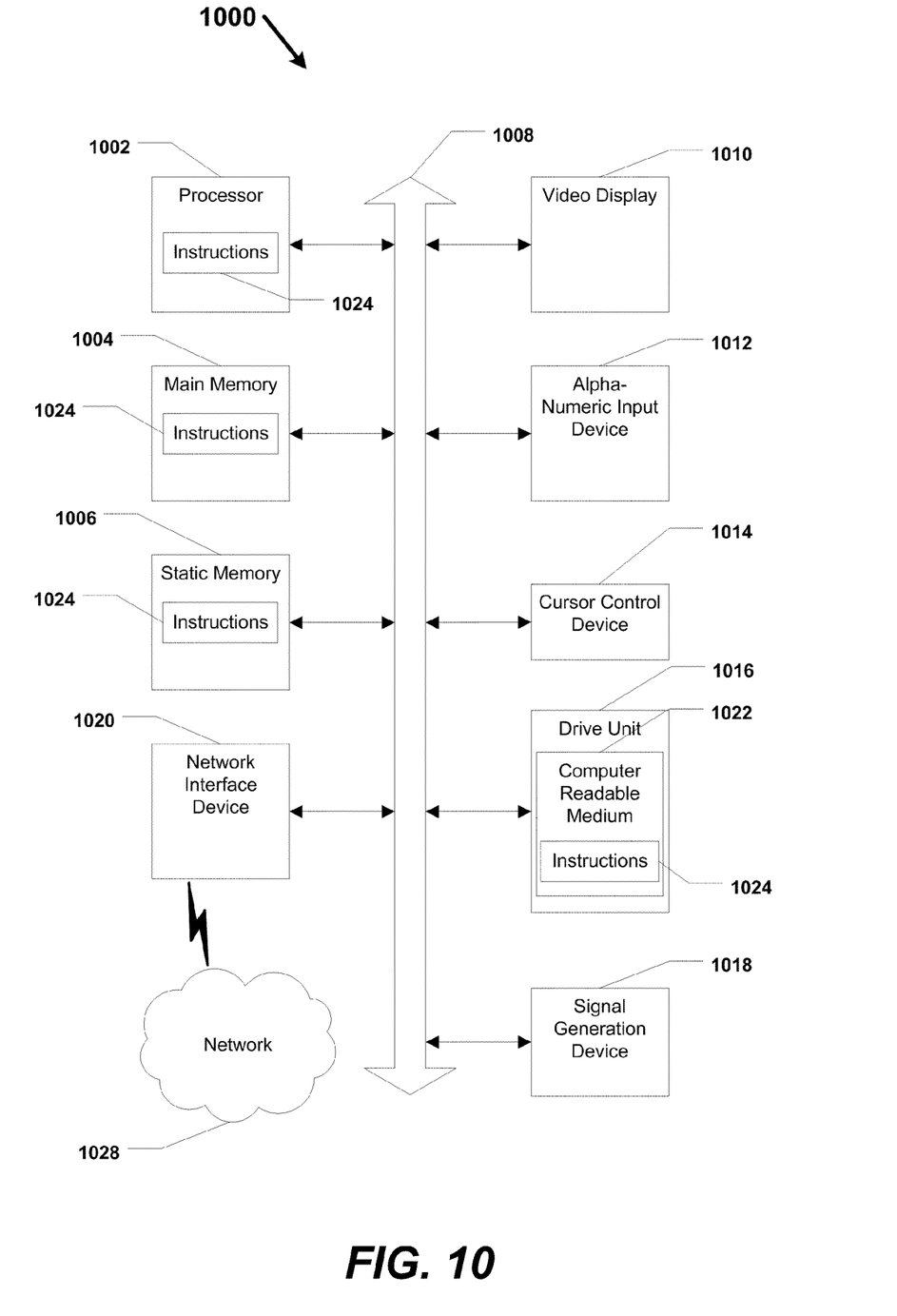
FIG. 10 depicts an illustrative embodiment of a general computer system.

Referring to FIG. 10, an illustrative embodiment of a general computer system is shown and is designated 1000. The computer system 1000 can include a set of instructions that can be executed to cause the computer system 1000 to perform any one or more of the methods or computer-based functions disclosed herein. For example, the computer system 1000 may include instructions that are executable to perform the methods discussed with respect to FIGS. 8 and 9. In particular embodiments, the computer system 1000 includes instructions to implement the graphical viewing navigation module 170 shown in FIG. 1. In particular embodiments, the computer system 1000 includes instructions to implement the graphical viewing navigation module 252 shown in FIG. 2. In a particular embodiment, the computer system 1000 includes or is included within the multimedia receiver shown in FIG. 2. In particular embodiments, the computer system 1000 includes or is included within a set top box, such as the set top box 202 shown in FIG. 1. The computer system 1000 may be connected to other computer systems or peripheral devices via a network, such as the network 140 shown in FIG. 1 or the IPTV access network 240 shown in FIG. 2. Additionally, the computer system 1000 may include or be included within other computing devices.

The methods disclosed in FIG. 8 and FIG. 9 allow a user to navigate multimedia content. The multimedia content may include a large amount of multimedia content and may include both multimedia programs in progress and stored multimedia content.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), a projection television display, a flat panel display, a plasma display, or a solid state display. Additionally, the computer system 1000 may include an input device 1012, such as a remote control device having a wireless keypad, a keyboard, a microphone coupled to a speech recognition engine, a camera such as a video camera or still camera, or a cursor control device 1014, such as a mouse device. The computer system 1000 can also include a disk drive unit 1016, a signal generation device 1018, such as a speaker, and a network interface device 1020. The network interface 1020 enables the computer system 1000 to communicate with other systems via a network 1026. For example, in particular embodiments the computer system 1000 includes or is included within a set top box. The network interface 1020 may enable the set top box to communicate with a multimedia distribution system, such as the multimedia distribution system 150 shown in FIG. 1 or the IPTV system 250 shown in FIG. 2, and to receive multimedia content to display on a display screen.

In a particular embodiment, as depicted in FIG. 10, the disk drive unit 1016 may include a computer-readable medium 1022 in which one or more sets of instructions 1024, e.g. software, can be embedded. For example, one or more modules, such as the graphical viewing navigation module 170 shown in FIG. 1 or the graphical viewing navigation module 252 shown in FIG. 2 can be embedded in the computer-readable medium 1022. Further, the instructions 1024 may embody one or more of the methods, such as the methods disclosed with respect to FIGS. 8 and 9, or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered equivalent to a tangible storage medium. Accordingly, the disclosure is considered to include any one or more of a computer-readable medium or other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all modifications, enhancements, and other embodiments, that fall within the true scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    sending a first display of a first plurality of selectable icons from a multimedia receiver to a display device, wherein each selectable icon of the first plurality of selectable icons is associated with a particular user profile;
    receiving a first selection of a particular first selectable icon of the first plurality of selectable icons, wherein the particular first selectable icon represents multimedia content associated with a first user profile;
    in response to receiving the first selection of the particular first selectable icon, sending a second display of the particular first selectable icon without other selectable icons of the first plurality of selectable icons and a second plurality of selectable icons to the display device,
        wherein the second plurality of selectable icons is associated with the first user profile,
        wherein a particular second selectable icon of the second plurality of selectable icons represents a particular multimedia program that is associated with the first user profile,
        wherein a particular third selectable icon of the second plurality of selectable icons is selectable to initiate a display of a third plurality of selectable icons,
        wherein each selectable icon of the third plurality of selectable icons is selectable to initiate a display of distinct stored multimedia content items of a collection of stored multimedia content items,
        wherein the collection of stored multimedia content items is associated with the first user profile, and
        wherein a particular fourth selectable icon of the second plurality of selectable icons is selectable to initiate a display of a particular stored multimedia content item associated with the first user profile; and
    in response to receiving a second selection of the particular second selectable icon of the second plurality of selectable icons at the multimedia receiver;
    initiating a search of a multimedia distribution system to locate a plurality of episodes of the particular multimedia program, wherein the plurality of episodes is available to the multimedia receiver; and
    displaying a fourth plurality of selectable icons, wherein the fourth plurality of selectable icons includes a first selectable episode icon and a second selectable episode icon, wherein the first selectable episode icon corresponds to a first episode of the plurality of episodes, and wherein the second selectable episode icon corresponds to a second episode of the plurality of episodes,
    wherein the display of the fourth plurality of selectable icons includes a display of:
        the particular first selectable icon without other selectable icons of the first plurality of selectable icons, and
        the particular second selectable icon of the second plurality of selectable icons without other selectable icons of the second plurality of selectable icons, and
    wherein the first selectable episode icon includes a display of the first episode and the second selectable episode icon includes a display of the second episode.

2. The method of claim 1, wherein searching the multimedia distribution system includes searching an electronic program guide.

3. The method of claim 1, wherein at least one selectable icon of the first plurality of selectable icons is modifiable by a user to include a first image comprising an image of a cartoon character or an image of a television personality.

4. The method of claim 3, wherein the first image is retrievable from a storage device.

5. The method of claim 3, wherein the first image is retrievable via a network.

6. The method of claim 1, wherein at least one selectable icon of the second plurality of selectable icons is modifiable by a user having permission to modify the first user profile.

7. The method of claim 1, further comprising, in response to the selection of the particular selectable icon, prompting for a user access credential prior to displaying the second plurality of selectable icons.

8. The method of claim 1, wherein the display of the third plurality of selectable icons further includes a display of:
the particular first selectable icon without the other selectable icons of the first plurality of selectable icons, and
the particular third selectable icon of the second plurality of selectable icons without other selectable icons of the second plurality of selectable icons.

9. A multimedia receiver comprising:
a network interface component configured to communicate with a multimedia distribution system; and
a graphical viewing navigation module that is coupled to the network interface component and is configured to:
 initiate a first display at a display device, wherein the first display includes a first plurality of selectable icons, and wherein each selectable icon of the first plurality of selectable icons is associated with a particular user profile;
 receive a first selection of a particular first selectable icon of the first plurality of selectable icons, wherein the particular first selectable icon represents multimedia content associated with a first user profile;
 initiate a second display at the display device in response to receipt of the first selection of the particular first selectable icon,
  wherein the second display includes the particular first selectable icon without other selectable icons of the first plurality of selectable icons and a second plurality of selectable icons,
  wherein the second plurality of selectable icons is associated with the first user profile,
  wherein the second plurality of selectable icons includes a particular second selectable icon that represents a particular multimedia program that is associated with the first user profile,
  wherein the particular second selectable icon is selectable to initiate a third display at the display device,
  wherein the third display includes:
   a display of a first episode of the particular multimedia program, and
   a display of a second episode of the particular multimedia program,
  wherein the second plurality of selectable icons includes a particular third selectable icon that represents a collection of stored multimedia content items associated with the first user profile,
  wherein the particular third selectable icon is selectable to initiate a display of a third plurality of selectable icons,
  wherein each selectable icon of the third plurality of selectable icons is selectable to initiate a display of distinct stored multimedia content items of the collection of stored multimedia content items,
  wherein a particular fourth selectable icon of the second plurality of selectable icons is selectable to initiate a display of a particular stored multimedia content item associated with the first user profile, and
  wherein the collection of stored multimedia content is stored at an accessible storage device, and
 in response to receiving a second selection of the particular second selectable icon of the second plurality of selectable icons:
  initiate a search of the multimedia distribution system to locate a plurality of episodes of the particular multimedia program, wherein the plurality of episodes is available to the multimedia receiver; and
  initiate the third display, wherein the first episode and the second episode are included in the plurality of episodes,
  wherein the third display includes:
   the particular first selectable icon without other selectable icons of the first plurality of selectable icons, and
   the particular second selectable icon of the second plurality of selectable icons without other selectable icons of the second plurality of selectable icons.

10. A computer-readable storage device storing instructions that, when executed by a processor, cause the processor to perform operations comprising:
sending a first display of a first plurality of selectable icons to a display device, wherein each selectable icon of the first plurality of selectable icons is associated with a particular user profile, wherein at least one selectable icon of the first plurality of selectable icons is modifiable by a user to include a first image comprising an image of a cartoon character or an image of a television personality;
receiving a first selection of a particular first selectable icon of the first plurality of selectable icons, wherein the particular first selectable icon represents multimedia content associated with a first user profile;
in response to receiving the first selection of the particular first selectable icon, sending a second display of the particular first selectable icon without other selectable icons of the first plurality of selectable icons and a second plurality of selectable icons,
 wherein the second plurality of selectable icons is associated with the first user profile, and
 wherein the second plurality of selectable icons includes a particular second selectable icon that represents a particular multimedia program associated with the first profile and further includes a particular third selectable icon that represents a collection of stored multimedia content items associated with the first user profile; and
in response to receiving a second selection of the particular second selectable icon of the second plurality of selectable icons:
 initiating a search of a multimedia distribution system to locate a plurality of episodes of the particular multimedia program, wherein the plurality of episodes is available; and
 displaying a third plurality of selectable icons, wherein the third plurality of selectable icons includes a first selectable episode icon and a second selectable episode icon, wherein the first selectable episode icon corresponds to a first episode of the plurality of episodes, and wherein the second selectable episode icon corresponds to a second episode of the plurality of episodes,
wherein the display of the third plurality of selectable icons includes a display of:
 the particular first selectable icon without other selectable icons of the first plurality of selectable icons, and
 the particular second selectable icon of the second plurality of selectable icons without other selectable icons of the second plurality of selectable icons, and
wherein the first selectable episode icon includes a display of the first episode and the second selectable episode icon includes a display of the second episode.

11. The computer-readable storage device of claim 10, wherein the second plurality of selectable icons further includes at least one selectable icon that is selectable to initiate playback of a particular stored multimedia content item associated with the first user profile.

12. The computer-readable storage device of claim 10, wherein the multimedia distribution system includes an internet protocol television network.

13. The computer-readable storage device of claim 10, wherein the operations further comprise:
   receiving a third selection of the third selectable icon of the second plurality of selectable icons; and
   in response to receiving the third selection of the third selectable icon of the second plurality of selectable icons, initiating a display of the particular first selectable icon without other selectable icons of the first plurality of selectable icons, the particular third selectable icon without other selectable icons of the second plurality of selectable icons, and a fourth plurality of selectable icons, wherein each selectable icon of the fourth plurality of selectable icons is selectable to initiate playback of a particular stored multimedia content item of the collection of stored multimedia content items.

14. The computer-readable storage device of claim 13, wherein each selectable icon of the fourth plurality of selectable icons is associated with a pointer to an associated stored multimedia content item of the collection of stored multimedia content items.

15. The computer-readable storage device of claim 13, wherein the particular stored multimedia content item is stored at a particular storage device.

\* \* \* \* \*